Dec. 8, 1942.   M. G. HASTINGS ET AL   2,304,088
APPARATUS FOR MANUFACTURING FILTERS
Original Filed Aug. 23, 1938   2 Sheets-Sheet 1
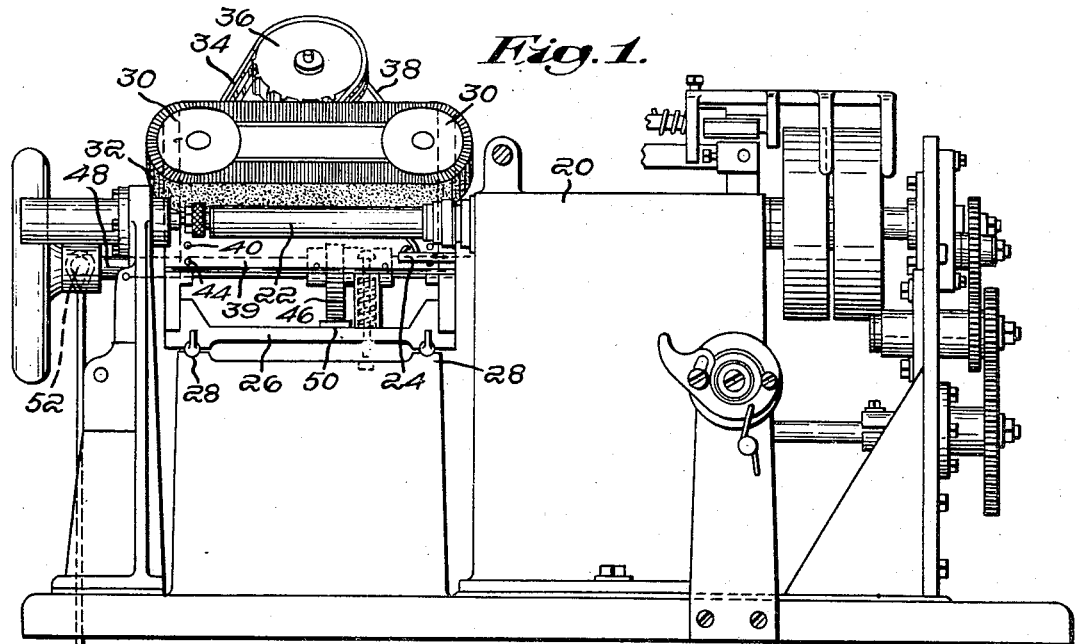
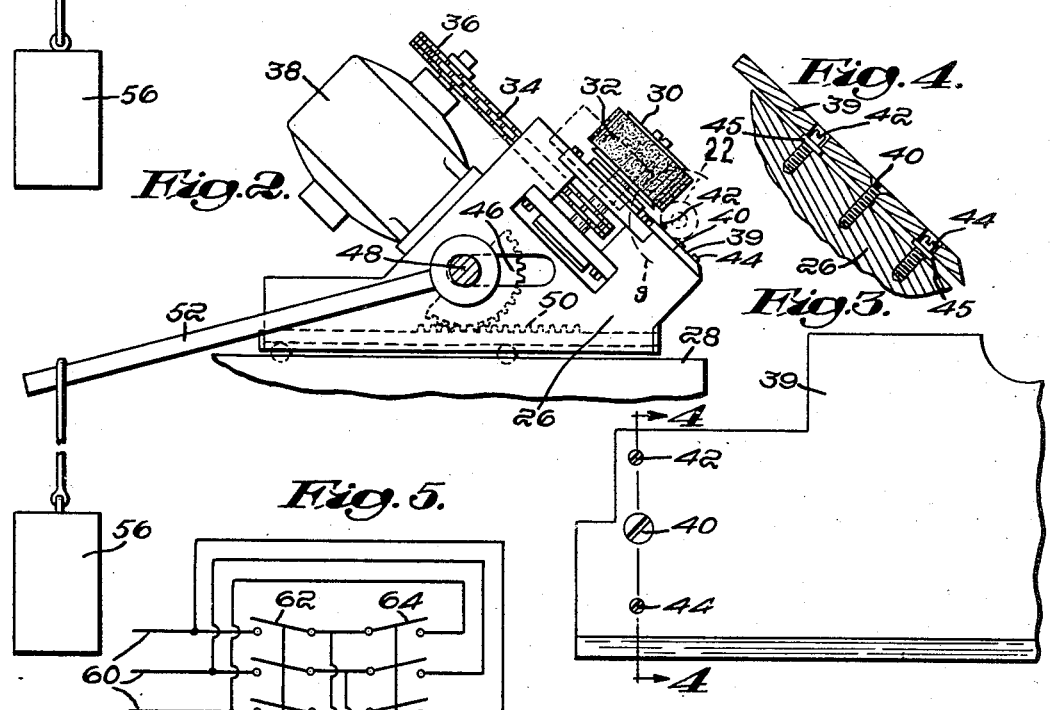
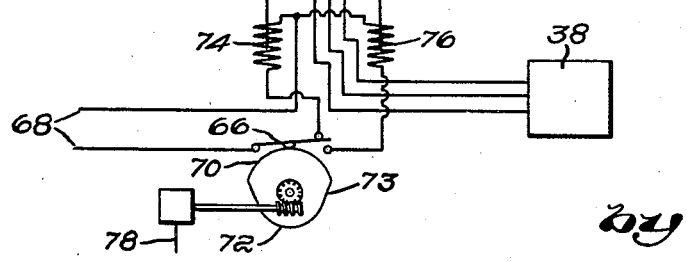

Dec. 8, 1942. M. G. HASTINGS ET AL 2,304,088
APPARATUS FOR MANUFACTURING FILTERS
Original Filed Aug. 23, 1938    2 Sheets-Sheet 2
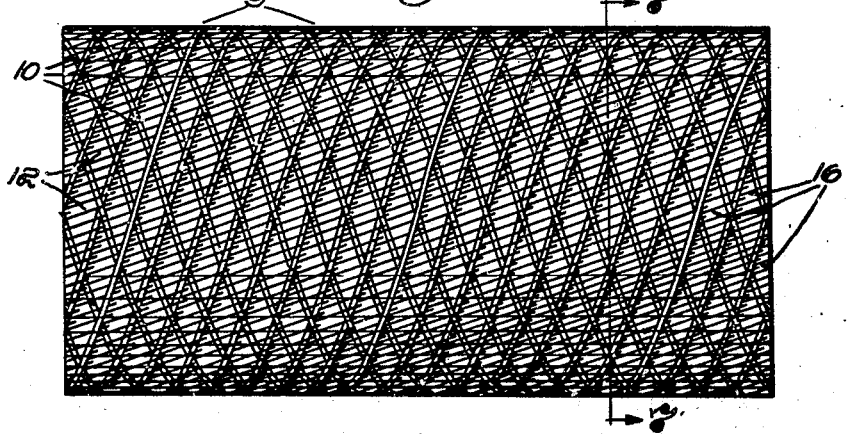
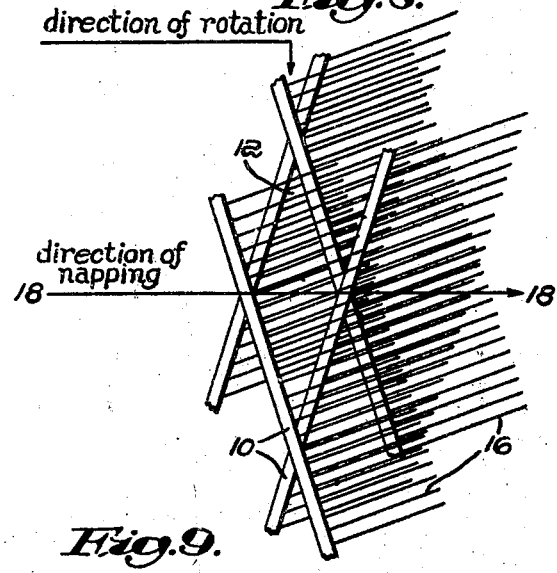
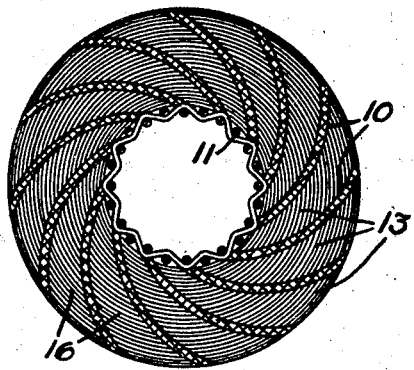
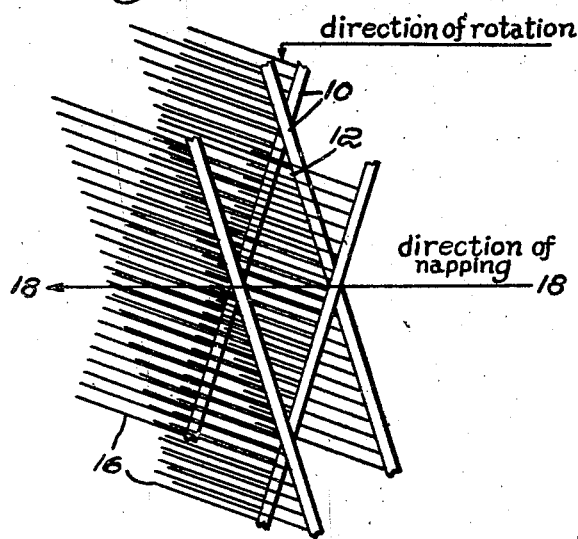
Inventors:
Merrill G. Hastings
Harry J. Hayward
Rowland V. Patrick
by
Attorney Patented Dec. 8, 1942

2,304,088

UNITED STATES PATENT OFFICE 2,304,088

APPARATUS FOR MANUFACTURING FILTERS

Merrill G. Hastings, Wellesley, and Harry James Hayward, Arlington, Mass., assignors to Merrill G. Hastings and Emita E. Hastings, both of Wellesley, Mass., and Robert L. Fielding, Cambridge, Mass., tenants-in-common Original application August 23, 1938, Serial No. 226,308. Divided and this application June 28, 1941, Serial No. 400,290

8 Claims. (Cl. 242—1)

This invention relates to apparatus for manufacturing filters of the tubular diamond-weave type set forth in Patent No. 1,958,268, dated May 8, 1934, and more specifically to an automatic machine for manufacturing the improved construction of filter by the method described in our co-pending application, Serial No. 226,308, filed August 23, 1938, of which this application is a division.

The filter element of the above Patent No. 1,958,268 is a tubular filter comprising a foraminous core upon which is wound a multiplicity of layers of spaced convolutions of a napped strand applied in criss-cross fashion to form a plurality of diamond-shaped filtering passages through the side wall of the tube through which the liquid to be filtered is caused to pass, the strands being napped during the progress of winding to form fibres which occupy the passages and catch impurities in the liquid being filtered. Due to the manner of winding the strand the two axes of each diamond-shaped passage lie respectively circumferential and axial of the tube, the circumferential axis increasing in length as the winding progresses and the axial axis remaining constant. In the tube filter of the above patent the direction of the napping is circumferential so that the napped fibers, which are carried across the diamond-shaped filtering passages and are bound down by the overlaid strands, lie circumferentially of the tube and along the circumferential axis of the diamond-shaped filtering passages.

In accordance with the disclosure in our prior parent application, we have discovered a new method of forming and drawing the napped fibres across the tunnels which materially increases the amount of the napped fibres that are carried completely across the tunnel passages, thereby increasing the density of the napped fibres drawn completely across the tunnels, which improves the filtration, and allowing tunnels of larger cross-section area to be used, which enlarges the capacity of the filter tubes as respects both the rate of flow of the filtered liquid and the total amount of the liquid which may be filtered before the tunnel passages of the tubes have become clogged. We have found that if the method of napping heretofore used is entirely changed and instead of drawing the napped fibres circumferentially of the tube, a belt or other means is used to draw the nap axially of the tube there will be a very unexpected improvement in result in that the fibres as a result of the component of the axial napping movement and the circumferential rotation of the tube will be drawn more nearly in the direction of the shortest distance across the tunnels and therefore a greater amount of the napped fibres will reach entirely across the tunnel and be locked in place by the strands subsequently laid.

The object of this invention is therefore the provision of apparatus for napping such a filter while it is being wound, such apparatus including the napping belt, movable in the axial direction of the rotating tube on which the filter element is wound. Our apparatus includes driving means for maintaining the speed of the napping belt throughout the winding process as great or, preferably, greater than the circumferential speed of the rotating tube so that the napped fibres are laid at an angle of inclination with the axis of the tube approximating the direction of shortest distance between the sides of the diamond-shaped passages.

A further feature of our apparatus is the provision of automatic mechanism for reversing the direction of movement of the napping belt so that the filter will have layers of parallel napped fibres having a relatively crossed relation to each other by repeated automatic reversals of the direction of movement of the napping belt and consequently of the napping during the process of the tube winding operation.

A further feature of our apparatus is automatic operating mechanism for increasing the pressure of the napping belt against the fibres as the winding progresses.

Our machine, and the nature of the filter element produced by operation of such a machine, are illustrated in the accompanying drawings, in which, Fig. 1 is a front elevation of our machine;

Fig. 2 is a side elevation of the napping frame of Fig. 1;

Fig. 3 is a plan detail of the pressure plate of Fig. 2;

Fig. 4 is a sectional detail along line 4—4 of Fig. 3, and illustrating the manner of adjusting said pressure plate;

Fig. 5 is a circuit diagram of the time reversing means for the belt driving motor;

Fig. 6 is a plan view of a filter element of the kind adapted to be wound and napped on the machine of Fig. 1;

Fig. 7 is a cross-sectional view of the filter element, taken along 7—7 of Fig. 6;

Fig. 8 is an enlarged diagrammatic plan view of a diamond-shaped filter passage, showing the arrangement of the filter fibres resulting from normal operation of our machine; and Fig. 9 is a view similar to Fig. 8, but in a different location along the length of the passage, and illustrating the opposite inclination of the filtering fibres, resulting from a reversal of the operation of the napping belt of our machine.

As illustrated in Figs. 6 through 9, and as described in our parent co-pending application heretofore referred to, the tubular cylindrical filter element 9 is composed of a plurality of layers of soft yarn 10, or more specifically roving, wound in a diamond weave upon a pervious core tube 11 formed of an open mesh wire fabric or netting in a plurality of layers of axially spaced and criss-crossed convolutions that are superposed in the several layers, thereby forming diamond-shaped apertures 12 between the crossed strands that are in alignment, at least in part, to form filtering passages or tunnels 13 through the winding from the circumference to the pervious core.

Due to the manner of winding the roving, one axis of the diamond-shaped passage 12 lies in the circumference of the filter while the other axis is parallel with the axis of the filter.

In accordance with the invention described in our parent co-pending application, the roving composing the filter is napped in a direction lengthwise of the axis of the filter to provide fibres 16 which extend from the convolutions across the apertures 12 and lie in a direction which is not circumferential of the filter tube but which may be nearly axial thereof or at a predetermined angle which will materially decrease the distance which the napped fibres must traverse to extend across the diamond, the free ends of the fibres preferably being bound under overlying convolutions.

Such a filter element may be made by the machine 20 illustrated in Figs. 1 and 2. The machine so far as the winding of the strands is concerned, may be essentially a well known Universal winding machine which includes a rotatable mandrel 22 on which the core 11 of the filter is placed for winding on the yarn, but any similar machine may be used. The machine has a yarn guide 24 which is reciprocated in front of the mandrel 22 in timed relation with the rotation of the mandrel to lay on the strands in the manner above explained.

The napping of the strands is accomplished by means including a carriage 26 disposed behind the mandrel and movable on ways 28 towards and away from the mandrel. The carriage supports a pair of pulleys 30 between which a napping belt 32 as of card clothing is extended. One of the pulleys is driven by a chain 34 and sprocket 36 from an electric motor 38 carried by the carriage. The carriage is provided with a pressure plate 39 the face of which is at approximately right angles to the work face of the napping belt and is adapted to bear against the tubular cylindrical filter element 9 on the mandrel, the pressure plate being so positioned with respect to the work face of the belt, the axis of the mandrel and the path of movement of the carriage that the wires of the belt will be always maintained in substantially the same relative contact with the surface of the filter element as it increases in diameter.

In order that the pressure plate can always be kept in proper position, its position can be adjusted to take care of wear in any moving parts of the machine by movement of the screws 40, 42 and 44 at each end of the plate. The screw 40 is passed loosely through the plate and is screw-threaded into the carriage. The screws 42 and 44 disposed on opposite sides of the screw 40, are loosely disposed in said plate and are screw-threaded in the carriage and have outstanding shoulders 45 which bear against the under face of the plate to move the plate 39 relative to the carriage 26.

The carriage is urged toward the tube by a segmental gear 46 fixed to a shaft 48 supported by the frame of the winding machine. The gear meshes with a rack 50 of the carriage and is urged for rotation in a direction to move the carriage toward the tube by a rearwardly extended arm 52 fixed to the shaft 48 and supporting a weight 56 adjustable along the length thereof. The angularity of the arm 52 preferably is such that the weight 56 is caused to exert more pressure on the carriage against the tube as the tube builds up in diameter and the carriage moves backward.

Thus just prior to the winding operation the plate 39 bears against the core 11, which has been positioned on the rotatable mandrel 22 (shown in dotted lines in Fig. 2), under the influence of the weight 56 which tends to move the carriage 26 to the right (Fig. 2). By adjusting plate 39 by means of screws 42 and 44 the relationship of the respective distances of the face of the pressure plate 39 and of the face of the belt 32, namely, the ends of the wires, from the axis of mandrel 22, may be varied. The variation of the relationship of these distances will determine the amount of the engagement of the wires of the belt 32 with the tubular cylindrical filter element 9 during the winding process. As the diameter of the filter element increases during winding this amount of engagement of the wires of the belt with the filter element will remain substantially the same throughout the winding process, subject to the effect of any progressive increased pressure of the pressure plate 39 against the filter element caused by the increased leverage of the weight 56 as the carriage 26 is forced away from the axis of mandrel 22 by contact of the filter element, as it is wound, with the pressure plate 39. At the conclusion of the winding process the filter element assumes the diameter indicated by the dotted circular line 9 in Fig. 2 and the belt 32 and pulley 30 (Fig. 2) assumes the dotted line position indicated in Fig. 2.

The napping belt 32 is sufficiently wide to engage the periphery of the tube from its smallest to its largest diameter as the tube builds up in diameter and its point of contact with the belt travels upwardly on the belt. The pass of the belt that confronts the tube is long enough to engage it from end to end. With this arrangement as the convolutions are wound on the tube they come in contact with the wires of the traveling belt which brush fibres in a direction axially of the tube to project away from the convolutions across the apertures between the convolutions.

Since the direction of the lay of the napped fibres is along the component of the belt speed and the peripheral speed of the tube, the angle which the napped fibres make with the tube axis depends upon the relation between the belt speed and the peripheral speed of the tube at any part thereof. This angle is smaller at the core than at the circumference of the finished tube since the peripheral speed of the tube increases as the winding builds up, the fibres of the succesive layers changing in angle progressively from the core to the circumference, the amount of the total change between the core and the circumference depending upon the ratio of the length of the diameter of the core to the thickness of the wall of the tube. The speed of the napping belt and the speed of the mandrel carrying the tube preferably bear a relationship one to the other such as to cause the napped fibres in the outside layer of yarn, where the area of the diamond-shaped tunnel passages is the greatest, to lie approximately in the direction of the shortest distance between the sides of the diamond. By being laid mainly in the direction of the shortest distance across the passages, the napped fibres, or most of them, completely traverse the passages so that their ends are bound down on the tube by the overlaid strand. This results in a very satisfactory filter and represents a marked improvement over a filter tube in which the nap is raised and laid circumferentially of the tube. The effectiveness of the filtration is increased because of the increased amount of napped fibre drawn completely across the passages and held in place by the overlaid strands of yarn. The passages also can be made larger than heretofore thereby permitting a more rapid flow of the fluid to be filtered through the filter and increasing the total amount of the fluid which the filter element can handle before its life is exhausted by the clogging of the tunnel passages.

The electric motor 38 is of the reversible type and may be automatically reversed periodically by the means illustrated in Fig. 5, so that the direction of napping is periodically reversed. The reversal is intended to take place at such times as to give the results desired and may take place at approximately each layer or otherwise.

The motor 38 is illustrated in Fig. 5 as being a three phase motor energized from a power source 60 through reversing switches 62 and 64 respectively energized through a double throw switch 66 from a line 68. Said switch 66 is operated by a cam disc having high and low peripheral portions 70 and 72 and intervening inclined portions 73. When the high portion 70 is under the switch 66 the winding 74 is energized to obtain one direction of rotation of the belt driving motor 38 and when the low portion 72 is under the switch the winding 76 is energized to obtain the opposite direction of rotation of the motor. The inclined portions 73 of the cam hold the control circuit open sufficiently long to permit the motor to lose considerable speed before reversal. The cam is driven at suitable speed by a timing motor 78 energized from the circuit 68.

By reason of the reversals of napping during the winding of the tube the fibres in different layers of nap in the filtering tunnels are oppositely inclined. For instance, the lay of the fibres in one section of a tunnel may be as illustrated in Fig. 8, while the lay of the fibres in another part of the same tunnel may be as illustrated in Fig. 9. This arrangement increases the efficiency of filtering as, for instance, a thin flake of an impurity may be aligned with one set of fibres and hence pass therethrough but will be crosswise or at least at an angle with another set of fibres and hence unable to pass between fibres of this set and hence will be caught by the fibres. This action of the filter takes place to a greater or less extent even without reversal of the direction of napping by reason of the progressive change of angle of lay of the fibres from the outside to the inside of the winding as has been explained above.

The reversal of the direction of napping also improves the filtering action in an additional manner. With large apertures the nap may be thinnest at or about the apex of the diamond opposite the sides from which the fibres start. By the reversal of napping, however, a thin section of nap of one layer is overlaid by a thick section of nap of another layer so that any particle that could pass through a thin section has to travel such a tortuous path in going from one thin section to another that it is surely trapped before it can emerge from the filter. Likewise there is a similar staggering of the areas where the ends of the napped fibres are held in place by being embedded in the strands from which they are drawn and of the areas where the opposite ends of the napped fibres are held in place by being bound down by the overlaid strands.

The reversal of direction of napping also results in an intermeshing of the napped fibres formed in napping the layer of the strands which is being wound when the reversal of the direction of napping occurs. This improves the filtration materially in the case of certain liquids, such as oils. Reversal of direction of the napping also increases both the amount and uniformity of napped fibre, since the yarn is napped on both sides instead of only on one side and also any diminution in napped fibre due to the twist of the yarn being inclined towards the movement of the napping member when moving in one direction is offset by an increase in napped fibre when the direction of the napping is reversed.

We claim:

1. In a machine for winding filter tubes, the combination of a winding machine having means to wind a strand in helical coils, an endless belt as of card clothing having a run parallel with the axis of the tubular body formed by the wound strand, means for driving said belt and means to keep the operative face of said belt as it is driven in contact with the surface of the tubular body formed by the winding of the strand so as to nap the strand as it is being wound.

2. A machine as claimed in claim 1, in which the belt driving means is operative independently of the means for driving the winding machine.

3. In a machine as claimed in claim 1, the combination therewith of automatically operative means to increase the pressure of the operative face of said belt on the surface of said tubular body as the winding progresses.

4. In a machine as claimed in claim 1, the combination therewith of reversible means to cause the endless belt to be driven in alternate directions as the tubular body is being wound.

5. In a machine for winding filter tubes, the combination of a winding machine having means to wind a strand in helical coils, a carriage mounted on said machine for movement towards and away from the axis of said winding means, a pair of pulleys mounted on said carriage, an endless belt as of card clothing positioned around said pulleys and having a run parallel with said winding means axis, means for driving said belt, and means for yieldingly urging said carriage towards said winding means axis to maintain a face of said belt as it is driven in contact with the surface of the tubular body formed by the winding of the strand so as to nap the strand as it is being wound.

6. A machine as claimed in claim 5, in which the carriage urging means acts to increase, as the winding progresses, the pressure of the belt face against the surface of the tubular body formed by the winding of the strand.

7. In a machine as claimed in claim 5, the combination therewith of a pressure plate mounted on the carriage and adapted to engage, independently of the belt, the surface of the tubular body formed by the winding of the strand, thereby determining successive positions of the carriage and therefore of the run of the belt relative to the axis of the mandrel as the winding progresses.

8. In a machine as claimed in claim 5, the combination therewith of a pressure plate adjustably mounted on said carriage and adapted to engage, independently of the belt, the surface of the tubular body formed by the winding of the strand, thereby determining successive positions of the carriage and therefore of the run of the belt, relative to the axis of the mandrel as the winding progresses.

MERRILL G. HASTINGS.
HARRY JAMES HAYWARD.